March 20, 1962 R. L. NIBLACK ET AL 3,026,209
PACKAGING OF FRESH MEAT AND POULTRY
Filed April 28, 1958
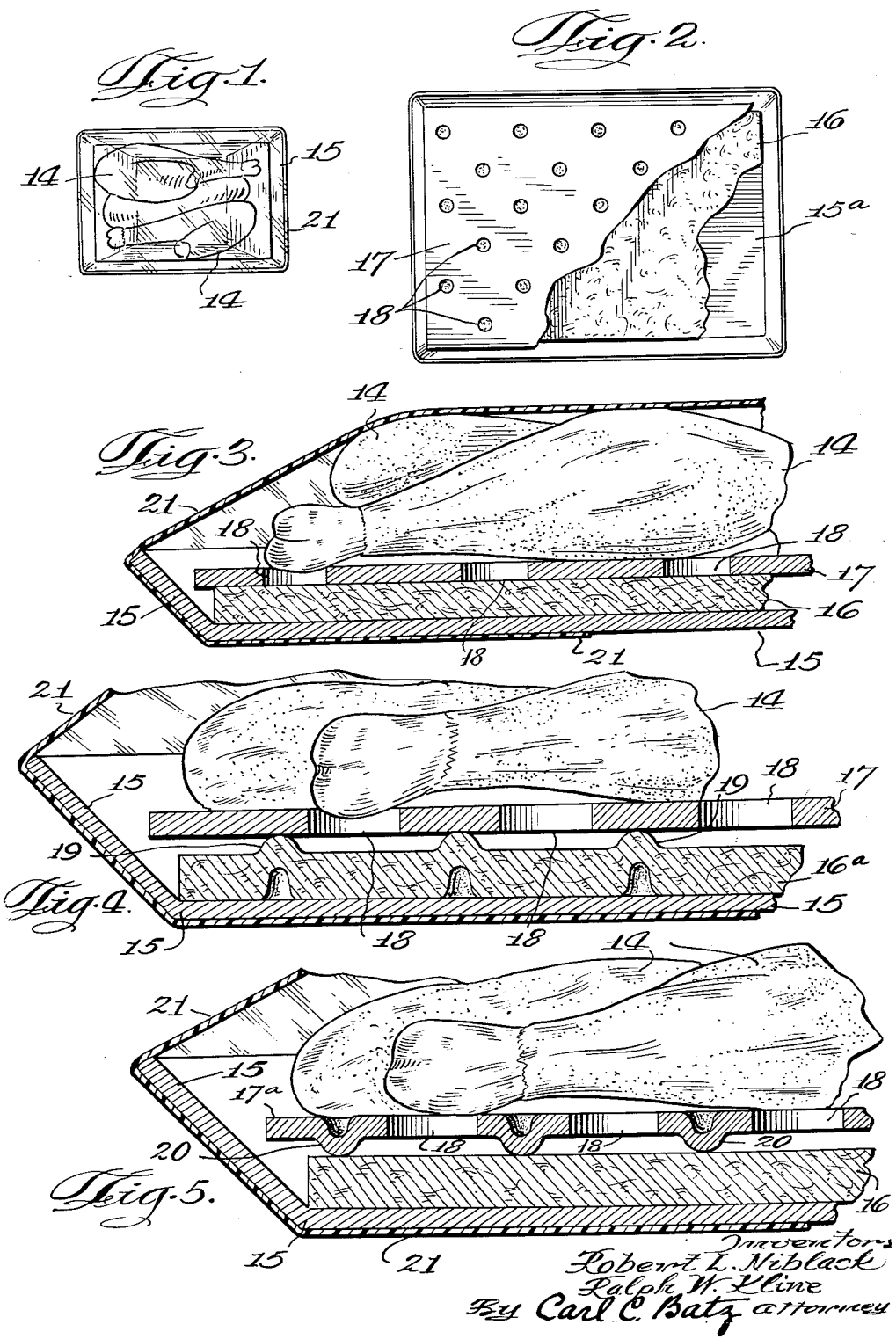
Inventors
Robert L. Niblack
Ralph W. Kline
By Carl C. Batz Attorney

3,026,209
PACKAGING OF FRESH MEAT AND POULTRY
Robert L. Niblack, La Grange Park, and Ralph W. Kline, Oaklawn, Ill., assignors, by mesne assignments, to Armour and Company, a corporation of Delaware
Filed Apr. 28, 1958, Ser. No. 731,480
6 Claims. (Cl. 99—174)

This invention relates to the packaging of meat products. The invention particularly relates to various types of meat and poultry packages having bacteriostatic agents incorporated therein.

Research has shown that the fluids dripping from poultry is a focal point of bacterial spoilage within packaged fresh meat and poultry products. The growth of microorganisms, particularly bacteria and yeast, occurs at a very rapid rate in such exuded fluids. The exudate is objectionable from an appearance standpoint, and moreover, the packed meat rapidly becomes objectionable because of odor and of yeast growth even though the meat itself is in a normal wholesome condition. Consequently, although the meat, itself, is wholesome and acceptable, the fluid exuded from the meat and contained within the package will cause the whole package of meat or poultry to be unsaleable. It is very important in the display and sale of packaged poultry and pre-cut meats that the package present a clean and wholesome appearance. The problem of maintaining such clean and wholesome appearance is greatly aggrevated by the fact that many meats, particularly pre-cut meats, and poultry exude moisture which causes the package to appear unclean. This exudate often evaporates or is absorbed in the packaging materials, and the suspended solids are deposited on the food product and on the package.

It is an object of the invention to provide an improved method of packaging poultry and meats which exude moisture. It is a further object to provide a package which will maintain a fresh, clean and wholesome appearance even though considerable meat exudate is present in the package. It is a further object to provide a package in which the growth of microorganisms is retarded or prevented by the presence of a bacteriostatic agent within the absorptive material of the package. Other objects and advantages of the intention will appear as the specification proceeds.

We have found that the problem of providing a wholesome appearing package and the problems of bacterial spoilage which occurs in meat and poultry packages because of the exudate within the packages as described above, can be overcome by providing a package wherein exuded materials are drained away from the food product through a barrier on which the food product is placed to the space beneath the barrier wherein absorptive material containing bactericidal agents is placed. The preferred bacteriostats are the broad spectrum antibiotics such as the tetracyclines, e.g. chlortetracycline and oxytetracycline; penicillin; sorbic acid; alkyl substituted or alkyl aryl substituted quaternary ammonium compounds such as trimethyldodecylammonium chloride, cetyltrimethylammonium bromide and alkyldimethylbenzylammonium chloride; chlorine containing compounds such as the hypochlorites and chloramines; iodine compounds such as sodium hypoiodite; phenol and its derivatives such as pentachlorophenol and orthophenylphenol; dehydroacetic acid; peroxygen compounds such as hydrogen peroxide, potassium persulfate, peracetic acid and sodium perborate.

We have used two basic methods of applying the bacteriostatic or bactericidal agent to the absorbent materials. The two basic methods are first wetting the absorptive material with an aqueous solution of the agent and then drying, or, second, mixing or impregnating the absorptive material with a dry agent. However, any method of placing the bacteriostatic or bactericidal agents within the absorptive material so that they will come in contact with the exudate may be used.

The invention is illustrated by the accompanying drawings in which:

FIG. 1 is a perspective view of one embodiment of the package of the invention illustrating the use of a package to contain and display poultry parts.

FIG. 2 is a cut-away view of the empty package wherein the base plate is in the form of a flat card.

FIG. 3 is a fragmentary vertical cross-sectional view of the package illustrating the arrangement of the poultry parts, barrier, absorbent and base plate which in this instance takes the form of a shallow tray.

FIG. 4 is a fragmentary vertical cross-sectional view illustrating a modification of the package of the invention wherein an air space or separation facilitating the flow of exudate is provided between the absorbent material and the barrier by means of a projection on the upper surface of the absorbent material.

FIG. 5 is a fragmentary vertical cross-sectional view of a second modification of the package of the invention wherein an air space is provided between the interlay and the absorbent material by means of projections on the lower surface of the interlay.

The invention is illustrated in the accompanying drawings. Referring now to FIGS. 3, 4 and 5, a shallow tray 15 forms the base plate of the package. The base plate may also be in the form of a card 15a as is illustrated in FIG. 2. The base plate, whether in the form of a card or shallow tray, may be made of chip board, pulp, aluminum, or plastic, or other material such as is commonly used in preparing retail units of shelf service type of meat package. An absorbent material 16, such as rag paper, cellulose sponge, or pulp paper blotter, having a capacity in excess of the moisture exuded by the meat or poultry during its normal shelf life is placed in the bottom of the tray. Other absorbents, such as natural sponge, silica gel, vegetable colloids, and gums, such as karaya, agar, and carragheen, and animal colloids, such as gelatin may also be used. Above the absorbent material is placed a barrier 17 composed of a non-absorbent moisture-impervious material. The barrier generally takes the form of a card, sheet, or tray, thus forming a false bottom in the package. The barrier may be waxed, plastic-impregnated, or film-laminated material, or it may be otherwise treated so as to make it moisture-impervious and non-absorbtive. A most important feature of the barrier is that it must separate the meat from the absorbtive material, yet permit juices to flow freely from the meat to the absorptive material beneath the barrier. Perforations 18 may be positioned in the false bottom or barrier in any suitable pattern and number and serve the purpose of permitting the juices exuded from the meat 14 to pass through the barrier 17 into the absorbent material 16 beneath.

In the modification of the invention shown in FIG. 4 of the drawings, the absorbent material 16a is of such a configuration that the barrier 17 does not contact the absorbent over its entire surface but rather only upon the raised portion 19 thereof. As illustrated in FIG. 5, a similar effect may be obtained by placing a barrier 17a having projections 20 on its lower surface over the absorbent material 16 which has a substantially plane surface. Such modifications facilitate the flow of exudate through the perforations 18 and into the absorbent material. The same effect may be obtained by placing a spacer or any similar means of spacing between the barrier and absorbent material.

The product and tray assembly, which comprises the base plate, absorbent, and barrier, may be enclosed in a transparent wrapping 21. This wrapping may be of any of the several commonly known transparent and moisture-impervious wrappings such as are sold under the trademarks Cellophane, Saran, Mylar and Pliofilm. Descriptions of these and similar trademarked products may be found in such publications as the Handbook of Material Trade Names by Zimmerman and Lavine, published by Industrial Research Service, Dover, N.H. These wrappings may be composed of cellulose, transparent sheets of rubber hydrochloride, polyesters, polymerized vinylidene chloride and many other materials.

The package of the invention may be easily manufactured by the successive operations of impregnating the absorbent material with the bacteriostatic agent, placing the absorbent material in a tray or on an analogous card or other base plate, placing the preforated barrier upon the absorbent material, putting meat upon the barrier, and wrapping the entire package in a transparent film. The tray assemblies may be conveniently assembled prior to the cutting and packaging of the meat.

In the ordinary meat and poultry packaging procedures known prior to this invention, meat cuts or poultry parts are placed on a base such as a card or shallow tray and are then wrapped in a transparent film. As the juice exudes from the poultry it runs down on the sides of the pieces and wrapping and collects in the bottom of the tray. The liquid might be removed from sight by using a base of absorbent material but this does not solve the present problem because such a base absorbs moisture and filters out the solids from the juice leaving the same messy condition on the inside next to the poultry parts. The absorbent material then takes on a soggy, messy blood-stained appearance. Because of these conditions where the exudate materials remain next to the poultry product, the contents of the package very often appear to be unwholesome even though the product is actually of high quality. This adverse impression of uncleanliness and unwholesomeness is increased when the product is removed from the package and the stained and soggy bottom of the package becomes visible.

In the package of this invention, juices, along with the suspended material, pass through the perforations of the false bottom or barrier of the package and are absorbed in the hidden moisture-absorbent material. The appearance of the package before and after the meat is removed is wholesome since all juices together with suspended solid are passed through to the absorbent and are not absorbed or filtered through an exposed surface. The consumer who opens the package would not under ordinary conditions be aware of the purge, juice and suspended material which is retained within the package.

The preparation of the absorbent material of this invention is further illustrated by the following specific examples.

*Example I*

In the preparation of an absorbent material for use in the meat package of this invention, a cellulose sponge was saturated with a solution containing 500 p.p.m. of a dialkyl dimethyl ammonium chloride (a quaternary ammonium chloride) wherein the alkyl groups are derived from coconut oil and have the following average composition relative to the alkyl groups:

| | Percent |
|---|---|
| Octyl | 8 |
| Decyl | 9 |
| Dodecyl | 47 |
| Tetradecyl | 18 |
| Hexadecyl | 8 |
| Octadecyl | 5 |
| Octadecenyl | 5 |
| Octadecadienyl | 5 |

After soaking the cellulose sponge in this solution, the sponge is air dried in compressed form. After drying the compressed sponge sheet is cut into appropriate sections for use as an absorbent material under the false bottom in the meat tray of the invention.

*Example II*

A treated paper absorbent material was prepared for use in the meat package by dusting dry blotter paper with chloratetracycline powder. The treated paper, having chloratetracycline powder contained therein, was cut into appropriate sizes and used beneath the barrier in the package of the invention.

*Example III*

An alkaline solution of sodium silicate containing 2% sorbic acid was acidified with sulfuric acid. The resulting gel was collected, washed free of salt and broken up to provide a granular material. The resulting granular material, i.e. the hydrogel, was thermally dried to give the granular absorbent which was thereafter placed in a perforated film bag of a size adapted to be used as an absorbent within the fresh meat package of the invention.

*Example IV*

A 3% agar dispersion was melted and adjusted to 50 p.p.m. active chlorine with sodium hypochlorite. The agar dispersion was then cooled in sheet form and appropriate sized portion were cut from the resulting sheet for use as absorbents in meat containers.

*Example V*

Granular gelatin was mixed with 0.05% tetrachlorophenol and dried, then placed in a container beneath a barrier in a meat package of the invention, the barrier being adapted to permit exudate to flow from the meat to the granular gelatin and also adapted to prevent the granular gelatin from contacting the meat.

In each of the above examples the absorbent material was found effective in absorbing meat exudate and preventing the unsightly appearance which occurs when meat juices flow freely within a retail-type meat container. The various bacteriostats incorporated within the absorbent material were also found to be effective in preventing the formation of odors and the growth of bacteria and other microorganisms.

Although the invention has been described and is illustrated in connection with a specific embodiment thereof, it will be understood that many variations and modifications of the invention may be made by those skilled in the art and that all of such modifications are within the scope of the invention.

We claim:

1. A meat package comprising a piece of meat, a substantially dry absorbent material adapted to receive and permanently retain juices and material suspended in such juices which exude from said meat, said absorbent material having a bacteriostatic agent incorporated therein whereby the growth of microorganisms within said juices which are absorbed within said absorbent material is prevented, a barrier formed of moisture-impervious and non-absorptive material between said meat and said absorbent material, said barrier being perforated to permit the passage of meat juices and material suspended in such juices to the absorbent material beneath, and means of maintaining an air space between said barrier and said absorbent material, said air space facilitating the flow of juices of said meat through the perforations of said barrier to the absorbent material beneath.

2. A meat package comprising a piece of meat, a substantially dry absorbent material adapted to receive and permanently retain juices and material suspended in such juices which exude from said meat, said absorbent material having a bacteriostatic agent incorporated therein whereby the growth of microorganisms within said juices which are absorbed within said absorbent material is prevented, and a barrier formed of moisture-impervious and non-absorptive material between said meat and said absorbent material, said barrier being perforated to permit the passage of meat juices and material suspended in such juices to the absorbent material beneath.

3. A meat package comprising a piece of meat, a substantially dry absorbent material adapted to receive and permanently retain juices and material suspended in such juices which exude from said meat, said absorbent material having a bacteriostatic agent incorporated therein whereby the growth of bacteria within said juices which are absorbed within said absorbent material is prevented, and a barrier formed of moisture-impervious and non-absorptive material between said meat and said absorbent material, said barrier being perforated to permit the passage of meat juices and material suspended in such juices to the absorbent material beneath, means of maintaining an air space between said barrier and said absorbent material, said air space facilitating the flow of juices from said meat through the perforations of said barrier to the absorbent material beneath, an impermeable base subjacent to said absorbent material, and a moisture-impervious wrapping covering the entire package.

4. A method of packaging poultry parts comprising impregnating an absorbent material with a bacteriostatic agent, placing said absorbent material in a substantially dry state in a shallow impermeable tray, placing a surface barrier composed of a moisture-impervious and non-absorptive material upon the upper surface of said absorbent material to form a false bottom in said tray, said surface barrier being perforated to prevent the passage of juices to said absorbent material, placing poultry parts upon said false bottom and enclosing the entire package in a moisture-impervious wrapping material.

5. In a method of packaging meat wherein said meat exudes moisture and wherein a substantially dry absorbent material is placed within the meat package to absorb said moisture and wherein a perforated barrier is placed between said meat and said absorbent, said perforated barrier being composed of a moisture-impervious and non-absorptive material, the step of impregnating said absorbent material with a bacteriostatic agent whereby the multiplication and growth of microorganisms within said absorbent material and the exudate permanently absorbed thereby is retarded.

6. A meat package comprising a piece of meat, a substantially dry absorbent material adapted to receive and permanently retain juices and material suspended in such juices which exude from said meat, said absorbent material having a bacteriostatic agent incorporated therein whereby the growth of microorganisms within said juices which are absorbed within said absorbent material is prevented, and a barrier formed of moisture-impervious and non-absorptive material between said meat and said absorbent material, said barrier being adapted to prevent contact between said meat and said absorbent material while also being adapted to permit the passage of meat juices and material suspended in such juices to the absorbent material beneath.

References Cited in the file of this patent

UNITED STATES PATENTS

| | | |
|---|---|---|
| 1,589,215 | Ordway | June 15, 1926 |
| 2,533,051 | Saunders | Dec. 5, 1950 |
| 2,559,109 | Boini | July 3, 1951 |